US012646125B2

(12) United States Patent
Basra et al.

(10) Patent No.: US 12,646,125 B2
(45) Date of Patent: Jun. 2, 2026

(54) COMPUTER SYSTEMS, METHODS, AND NON-TRANSITORY COMPUTER-READABLE STORAGE DEVICES FOR OPTIMAL HOME RENTALS

(71) Applicant: Royal Bank of Canada, Toronto (CA)

(72) Inventors: Neha Basra, Brampton (CA); Hamoon Zamiri, Toronto (CA); Grace Tianjiao Zhang, Calgary (CA); Alicia Zhang, Richmond Hill (CA); Chai K Lam, Toronto (CA); Rosemary Sutton, Mississauga (CA)

(73) Assignee: Royal Bank of Canada, Toronto (CA)

( * ) Notice: Subject to any disclaimer, the term of this patent is extended or adjusted under 35 U.S.C. 154(b) by 39 days.

(21) Appl. No.: 18/810,109

(22) Filed: Aug. 20, 2024

(65) Prior Publication Data

US 2025/0069168 A1    Feb. 27, 2025

Related U.S. Application Data

(60) Provisional application No. 63/578,351, filed on Aug. 23, 2023.

(51) Int. Cl.
G06Q 50/16 (2024.01)
G06Q 30/0601 (2023.01)

(52) U.S. Cl.
CPC ......... G06Q 50/16 (2013.01); G06Q 30/0631 (2013.01)

(58) Field of Classification Search
CPC ..................................................... G06Q 50/16
See application file for complete search history.

(56) References Cited

U.S. PATENT DOCUMENTS

| | | | | |
|---|---|---|---|---|
| 11,049,166 | B2 * | 6/2021 | Sprangers | G06Q 10/087 |
| 2020/0005192 | A1 * | 1/2020 | Kumar | G06N 5/025 |
| 2020/0184580 | A1 * | 6/2020 | Ye | G06Q 30/0202 |
| 2020/0250715 | A1 * | 8/2020 | Mustafi | G06F 18/24 |
| 2022/0172309 | A1 * | 6/2022 | Corona Pompa | G06Q 30/06 |

OTHER PUBLICATIONS

Hassan, Ali et al., "Enterprise Application Outage Prediction Using XGBoost and LSTM, " 3rd International Workshop on Analytics for Service and Application Management (AnServApp 2023), IEEE Xplore, 5 pages. (Year: 2023).*

* cited by examiner

*Primary Examiner* — Michael Fuelling

(57) ABSTRACT

Computer systems, apparatuses, processors, and non-transitory computer-readable storage devices configured for executing a method having the steps of: using a first machine learning engine for generating neighborhood recommendations based on a user's preferences; and/or using a second machine learning engine for comparing a price of a rental listing with an average price range and for determining reliability of the rental listing.

20 Claims, 12 Drawing Sheets

Neighborhood info/recomm. (302)

Neighborhood recomm. engine (ML) (322)

Neighborhood info. service (324)

326

Scam detector (304)

Scam detector engine (ML) (332)

336

Rental deposit alternative (306)

User details service (342)

346

Deposit alternative approval Service (352)

356

Landlord claim service (362)

366

Onboarding & pay service (372)

376

Auxiliary/helper service (308)

Authentication service (382)

386

Notification service (392)

396

Listings info/Recomm. (310)

Rental listing recomm. engine (ML) (402)

Rental listing info service (404)

406

Documentation (312)

Doc hub service (412)

416

418

Tenant appl service (422)

426

Legend

 A service, expose some APIs and contains some business logic, independently deployed and dockerized

 Database layer served through Armada, either MongoDB or PostgreSQL depending on the service

 Object storage

1. Initialize cluster centroids $\mu_1, \mu_2, \ldots, \mu_k \in \mathbb{R}^d$ randomly.

2. Repeat until convergence: {

For every $i$, set $$c^{(i)} := \arg\min_j \|x^{(i)} - \mu_j\|^2.$$

For each $j$, set $$\mu_j := \frac{\sum_{i=1}^n 1\{c^{(i)} = j\} x^{(i)}}{\sum_{i=1}^n 1\{c^{(i)} = j\}}.$$

$$D_m = \frac{\partial (Cost\ Function)}{\partial m} = \frac{\partial}{\partial m}\left(\frac{1}{n}\sum_{i=0}^n (y_i - y_{i\,pred})^2\right)$$

$$= \frac{1}{n}\frac{\partial}{\partial m}\left(\sum_{i=0}^n (y_i - (mx_i + c))^2\right)$$

$$= \frac{1}{n}\frac{\partial}{\partial m}\left(\sum_{i=0}^n (y_i^2 + m^2 x_i^2 + c^2 + 2mx_i c - 2y_i m x_i - 2y_i c)\right)$$

$$= \frac{-2}{n}\sum_{i=0}^n x_i(y_i - (mx_i + c))$$

$$= \frac{-2}{n}\sum_{i=0}^n x_i(y_i - y_{i\,pred})$$

FIG. 5A

$$D_c \equiv \frac{\partial (Cost\ Function)}{\partial c} \equiv \frac{\partial}{\partial c}\left(\frac{1}{n}\sum_{i=0}^{n}(y_l - y_{l\,pred})^2\right)$$

$$= \frac{1}{n}\frac{\partial}{\partial c}\left(\sum_{i=0}^{n}(y_l - (mx_i + c))^2\right)$$

$$= \frac{1}{n}\frac{\partial}{\partial c}\left(\sum_{i=0}^{n}(y_l^2 + m^2 x_i^2 + c^2 + 2mx_i c - 2y_l mx_i - 2y_l c)\right)$$

$$= \frac{-2}{n}\sum_{i=0}^{n}(y_l - (mx_i + c))$$

$$= \frac{-2}{n}\sum_{i=0}^{n}(y_l - y_{l\,pred})$$

$$c = c - LDc$$

FIG. 5C

Neighbourhood Recommendation    Value Comparison    Rental Deposit Solution    For You Page    Sign-in ⊕

Neighbourhood Recommendations

Find your ideal neighbourhood with 2 simple questions

---

Budget
Select a budget range

| Min price $0 | Max price $500+ |

— 652

---

Neighbourhood goals
Select three must-haves

| Grocery Stores | Safety | Transit-friendly |
| Restaurants | Schools | Walkability |

COMPUTER SYSTEMS, METHODS, AND NON-TRANSITORY COMPUTER-READABLE STORAGE DEVICES FOR OPTIMAL HOME RENTALS

CROSS-REFERENCE TO RELATED APPLICATIONS

This application claims the benefit of U.S. Provisional Patent Application Ser. No. 63/578,351, filed Aug. 23, 2023, the content of which is incorporated herein by reference in its entirety.

TECHNICAL FIELD

The present disclosure relates generally to computer systems, methods, and non-transitory computer-readable storage devices, and in particular to computer systems, methods, and non-transitory computer-readable storage devices for optimal home rentals.

BACKGROUND

Computerized real-estate rental services such as Rent Faster, LocNest, and Adralis are known. Rent Faster provides real-estate rental search services. LocNest facilitates renters to find rental real-estate properties such as houses, townhouses, condos, and the like. LocNest also acts as a guarantor and charges 8% of a tenant's rent each year to guarantee that the rent gets paid to the landlord. LocNest in this situation. If a tenant does not pay rent to the landlord, LocNest then takes on the liability and will pursue the tenant to ask them to pay LocNest. Adralis operates through a letter of credit. Similar to LocNest, if the tenant does not pay the landlord rent, Adralis will pay the landlord, and then chase the tenant for rental payments.

Such computerized real-estate rental services expand the functionalities and uses of computer systems, thereby making the computer systems more useful. However, these prior-art services and the corresponding prior-art computer systems have their limits in functionalities and uses. For example, it is often difficult for users of the prior-art computer systems to find rentals meeting their needs. Moreover, neither of these prior-art services offer a product that could be classified as insurance.

There are a few neighborhood explorer tools in Canada, but they only provide information or filters, which may not lead to recommendations fit the user preferences.

Moreover, the conventional solutions for protecting renters from scam listings are focused on verification, through requiring the landlord to submit proof that their listing is real. However, such solutions would not help renters avoid scams independently and without the landlord's input. Another conventional method is searching online for ways to avoid scams. While people may find articles with advice, the online search services usually do not provide interactive tools for scam avoidance.

Therefore, there is a desire for a computerized rental service for facilitating renters to find rental real-estate properties that fit their preferences, avoid scam listings, and/or providing rental deposit insurances.

SUMMARY

According to one aspect of this disclosure, there is provided a computerized method comprising: using a first machine learning engine for generating neighborhood recommendations based on a user's preferences; and/or using a second machine learning engine for comparing a price of a rental listing with an average price range for determining reliability of the rental listing.

In some embodiments, the user's preferences comprise a budget range and one or more other features of a home.

In some embodiments, the first machine learning engine comprises a k-means clustering method.

In some embodiments, said using the first machine learning engine for generating neighborhood recommendations based on the user's preferences comprises: building a dataset having a plurality of data points, each data point being a numerical value representing a piece of neighborhood information; normalizing the dataset such that the numerical value of each data point is between zero and one; randomly assigning each data point to a cluster of a plurality of clusters; calculating a centroid of each cluster; re-assigning each data point to a cluster whose centroid, among the centroids of the plurality of clusters, is at a shortest Euclidean distance to the data point; re-calculating the centroid of each cluster; repeating said re-assigning and re-calculating until the calculated cluster centroids are unchanged; and selecting one of the plurality of clusters as the neighborhood recommendations, the data points of the selected cluster, among the plurality of clusters, being closest to the centroid thereof.

In some embodiments, the selected cluster, among the plurality of clusters, have a minimum summation of squares of the distances from the data points thereof to the centroid thereof.

In some embodiments, the second machine learning engine comprises a regression model.

In some embodiments, the second machine learning engine comprises an XGBoost model.

In some embodiments, the computerized method further comprises: receiving, by a middle layer, the user's preferences from the user via a first hypertext transfer protocol (HTTP) request; storing the received user's preferences in a database; sending the received user's preferences from the middle layer to a recommendations model via a second HTTP for said using the first machine learning engine for generating the neighborhood recommendations; receiving, by a middle layer, the generated neighborhood recommendations from the recommendations model via a first HTTP response in response to the second HTTP request; and sending the generated neighborhood recommendations from the middle layer to the user via a second HTTP response in response to the first HTTP request.

In some embodiments, the computerized method further comprises: receiving the user's preferences from the user via a third HTTP request; using a third machine learning engine for determining an expected price for a rental unit in an area that matches or is similar to the user's preferences; and sending the determined price to the user via a fourth HTTP request.

According to one aspect of this disclosure, there is provided a system comprising one or more processors; and one or more non-transitory computer-readable storage media functionally coupled to the one or more processors; wherein the or more non-transitory computer-readable storage media comprise computer-executable instructions; and wherein the instructions, when executed, cause the one or more processors to perform the above-described method.

According to one aspect of this disclosure, there is provided one or more non-transitory computer-readable storage devices comprising computer-executable instructions, wherein the instructions, when executed, cause one or more processing units to perform the above-described method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 3 is a schematic diagram showing a functional architecture of the computer network system shown in FIG. 1, according to some embodiments of this disclosure;

FIG. 4 shows the general process and formulas for conducting a k-means clustering method;

FIGS. 5A to 5C show gradient descent calculations for a linear regression model;

FIGS. 8A to 8G are screenshots showing an exemplary user interaction flow.

DETAILED DESCRIPTION

Figure 1:
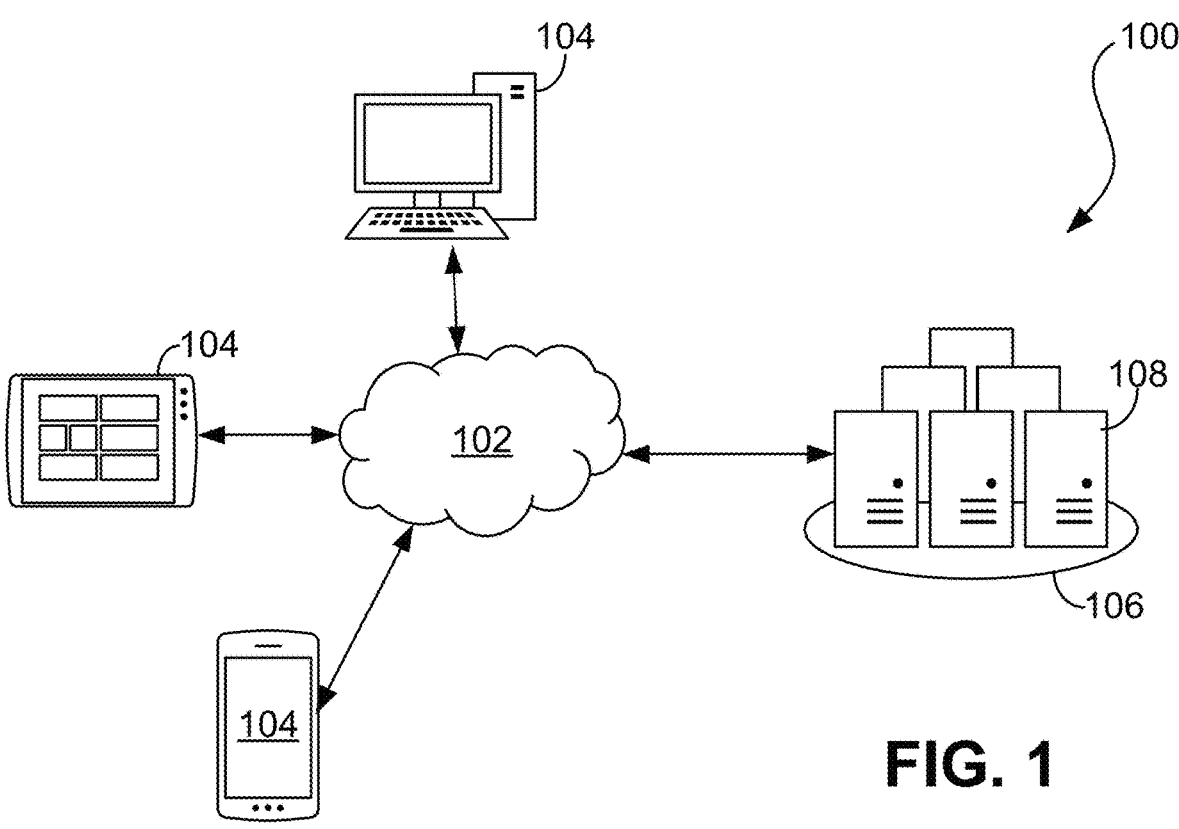
FIG. 1 depicts a computer network system according to some embodiments of this disclosure.

Embodiments disclosed herein relate to a computer network system and related software applications such as web applications for supporting renters by offering personalized recommendations and advices, and helping users track their progress with finding a place to rent.

Throughout the user journey, the computer network system disclosed herein acts as a planning system that provides a personalized user journey map to help sequence and navigate the various tasks and decisions required to rent a home.

In some embodiments, the computer network system disclosed herein uses one or more artificial intelligence (AI) engines such as machine learning (ML) engines to provide specific, personalized recommendations for neighborhoods to live in, based on a user's preferences and their personality.

In some embodiments, the computer network system disclosed herein uses one or more AI engines such as ML engines for comparing a listing price to the average rent prices of similar listings in a neighborhood, which helps users identify rental listings that fall outside the regular attributes of a renting property.

As those skilled in the art will understand, due to the complexity of the AI engines and models, and due to the large amount of data for training the AI models, the AI-based neighborhoods recommendation methods disclosed herein cannot be manually performed and a computer system is generally required.

In conventional rental markets, a tenant, when signing a rental agreement with a landlord, often needs to pay a rental deposit. In some embodiments, the computer network system disclosed herein provides a tool for allowing a financial institution (such as an insurance and/or financial company, which may be the owner of the computer network system)

to provide rental deposit insurance to a tenant with the tenant paying a small monthly fee (for example, as the premium of the rental deposit insurance) such that the tenant does not need to pay a large rental deposit. A rental deposit insurance is different from the conventional renters' insurance which protects the renters' contents.

In some embodiments, the computer network system disclosed herein also comprises a widget and software development kit (SDK) to allow a financial institution to offer rental deposit options to third-party partners on their websites as part of the embedded finance and go-to-market strategy.

In various embodiments, the computer network system disclosed herein may comprise one or more of:

a neighborhood recommendation engine using ML (such as a k-means clustering method) for generating neighborhood recommendations;

a neighborhood information service;

a value comparison/listing reliability tool using ML to provide the user an insight into whether or not the listing data is typical for that area with similar characteristics (such as three-bedroom, three-bath condos in downtown Toronto, or the like), or if the listing is "too good to be true";

an authentication micro-service to protect application programming interfaces (APIs) of the computer network system;

a notifications micro-service to keep up with users and send emails regarding future offerings and services;

a documentation hub micro-service for keeping track of user's common application documents to rental listings, provide a one-click apply feature where the computer network system disclosed herein may provide a user a landlord's email address, let the user select which documents they need to provide, attach a automatically filled form, and package and send the entire rental application in one email to the landlord with an option to download all those documents combined into one zip file, or allow the user to manually apply or print;

integrating claims made by landlords for the rental deposit coverage product, either done by a third party or built in-house as a service; and a banking/insurance service (such as a rental deposit insurance) acting as an alternative to traditional rent deposits which integrates onboarding and payments to the rental deposit product, either through a third party, or connecting to a payment API.

Referring now to FIG. 1, there is shown a computer network system 100 that comprises an example embodiment of a computerized rental service system. Herein, a "user" refers to a user of the computer network system 100.

As shown in FIG. 1, the computer network system 100 comprises a network 102 such as a local area network (LAN), a metropolitan area network (MAN), a wide area network 102 (WAN; for example, the Internet) and/or the like, to which various user devices 104, and data center 106 are communicatively coupled via suitable wired and/or wireless networking connections, such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 4G, 5G, 6G, and/or other mobile communication networks, and/or the like. In some embodiments, parallel ports, serial ports, USB connections, optical connections, or the like may also be used for connecting other computing devices or networks although they are usually considered as input/output interfaces for connecting input/output devices.

The data center 106 comprises one or more servers 108 networked together to collectively perform various computing functions. For example, in the context of a financial institution such as a bank, the data center 106 may host online banking services that permit users to log in to servers 108 thereof using user accounts that give them access to various computer-implemented services, such as rental and related services and/or online fund transfers.

Figure 2:
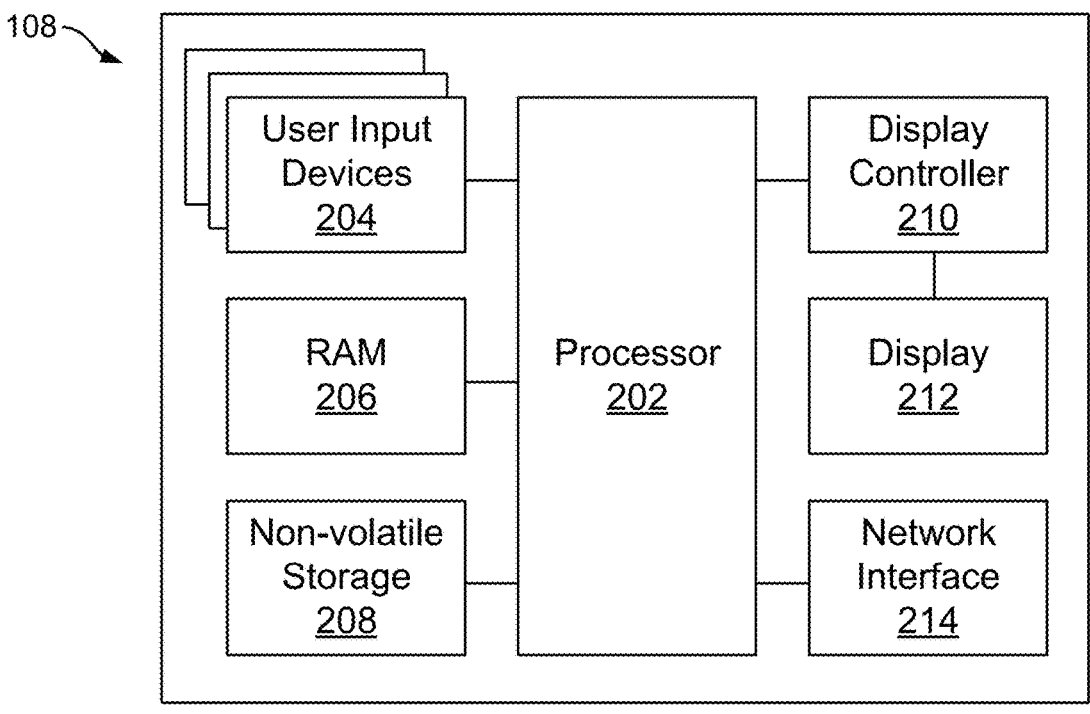
FIG. 2 is a block diagram of a server of the computer network system shown in FIG. 1.

Referring now to FIG. 2, there is depicted an example embodiment of one of the servers 108 of the data center 106. The server 108 comprises one or more processors 202 that control the server's overall operation. The one or more processors 202 are communicatively coupled to and control several subsystems. These subsystems comprise one or more user input devices 204, which may comprise, for example, any one or more of a keyboard, mouse, touch screen, voice control, and/or the like; one or more non-transitory computer-readable storage devices or media 206 such as random access memory ("RAM"), which store computer-executable instructions or program code for execution at runtime by the processor 202; non-transitory, non-volatile, computer-readable storage devices or media 208, which store the computer-executable instructions or program code executed by the RAM 206 at runtime; a display controller 210, which is communicatively coupled to and controls a display 212; and a network interface 214, which facilitates network communications with the wide area network 102 and the other servers 108 in the data center 106. The non-volatile storage 208 has stored thereon computer program code that is loaded into the RAM 206 at runtime and that is executable by the processor 202. When the computer program code is executed by the processor 202, the processor 202 causes the server 108 to implement the method disclosed herein (described in more details below) (described in more detail below). Additionally or alternatively, the servers 108 may collectively perform that method using distributed computing. While the system depicted in FIG. 2 is described specifically in respect of one of the servers 108, analogous versions of the system may also be used for the user devices 104.

The processor 202 used in the foregoing embodiments may comprise, for example, a processing unit (such as one or more processors, microprocessors, or programmable logic controllers) or one or more microcontrollers (which comprise both one or more processing units and one or more non-transitory computer readable media). Examples of processors include INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like.

Examples of computer readable media that are non-transitory include disc-based media such as CD-ROMs and DVDs, magnetic media such as hard drives and other forms of magnetic disk storage, semiconductor-based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

Generally, each processor 202 comprises necessary circuitries implemented using technologies such as electrical and/or optical hardware components for executing one or more processes as the implementation purpose and/or the use case maybe, to perform various tasks. In many embodiments, the one or more processes may be implemented as firmware and/or software stored in the RAM 206 and/or the storage 208. Those skilled in the art will appreciate that, in these embodiments, the one or more processors 202 and the computing devices 104 and/or 106 are usually of no use without meaningful firmware and/or software. On the other hand, a computing device 104 or 106 is practically useful only when it has a suitable software program to execute for performing a practical task. Therefore, the functionalities and uses of a computing device 104 or 106 are not only determined by its hardware (which may, for example, make the computing device 104 or 106 more "powerful"), but also determined by its software (which may, for example, make the computing device 104 or 106 more efficient and useful in more practical areas). Therefore, hardware and software are generally integrated parts of a computing device 104 or 106.

FIG. 3 is a schematic diagram showing a functional architecture 300 of the computer network system 100, according to some embodiments of this disclosure.

As shown, the computer network system 100 comprises a neighboring information/recommendation module 302, a scam detector module 304, a rental deposit alternative service module 306, an auxiliary/helper service module 308, a listings information/recommendation module 310, and a documentation module 312. Each of these module comprises one or more services. Herein, a service is a function block exposing some application programming interfaces (APIs) and containing some business logic, and may be independently deployed and dockerized. Herein, a "module" is a term of explanation referring to a hardware structure such as a circuitry implemented using technologies such as electrical and/or optical technologies (and with more specific examples of semiconductors) for performing defined operations or processings. A "module" may alternatively refer to the combination of a hardware structure and a software structure, wherein the hardware structure may be implemented using technologies such as electrical and/or optical technologies (and with more specific examples of semiconductors) in a general manner for performing defined operations or processings according to the software structure in the form of a set of instructions stored in one or more non-transitory, computer-readable storage devices or media.

As a part of a device, an apparatus, a system, and/or the like, a module may be coupled to or integrated with other parts of the device, apparatus, or system such that the combination thereof forms the device, apparatus, or system. Alternatively, the module may be implemented as a stand-alone device or apparatus.

The neighboring information/recommendation module 302 comprises a neighboring recommendation engine 322 and a neighboring information service 324 both linked to a database layer 326. The neighboring recommendation engine 322 in these embodiments is a machine learning (ML) engine.

The scam detector module 304 comprises a scam detector engine 332 linked to a database layer 336. In these embodiments, the scam detector engine 332 is a ML engine.

The rental deposit alternative service module 306 comprises a user details service 342 linked to a database layer 346, a deposit alternative approval service 352 linked to a database layer 356, a landlord claim service 362 linked to a database layer 366, and an onboarding and payment service 372 linked to a database layer 376.

The auxiliary/helper service module 308 comprises an authentication service 382 linked to a database layer 386 and a notification service 392 linked to a database layer 396.

The listings information/recommendation module 310 comprises a rental listing recommendation engine 402 and a rental listing information service 404 both linked to a database layer 406. In these embodiments, the rental listing recommendation engine 402 is a ML engine.

The documentation module 312 comprises a documentation hub service 412 linked to a database layer 416 and an object storage 418, and a tenant application service 422 linked to a database layer 426.

In various embodiments, the above-described database layers 326, 336, 346, 356, 366, 376, 386, 396, 406, 416, and 426 may be separate database layers or a same database layer. In some embodiments, each database layer is served through Armada, and may be either MongoDB or PostgreSQL depending on the service linked thereto. As those skilled in the art understand, Armada is an infrastructure-as-a-service tool for provision storage.

In various embodiments, the above-described ML engines 322, 332, and 402 may be separate ML engines or a same ML engine.

In some embodiments, unsupervised ML methods, such as k-means clustering, hierarchical clustering, and/or the like may be used to generate neighborhood recommendations. For example, in one embodiment, the neighborhood recommendation engine 322 may use a k-means clustering method with input parameters of user-entered minimum and maximum budget range and one or more (such as top three) features the user prefers to have in a home (such as walk score, transit score, safety, nearby grocery stores, nearby malls, nearby schools, and/or the like).

FIG. 4 shows the general process and formulas for conducting the k-means clustering method, with k being the number of clusters to be found and c (i) being the cluster label for each data point i.

By using the k-means clustering method, the neighborhood recommendation engine 322 may perform the following method for neighborhood recommendations:

1. Build a dataset with neighborhood information (such as walk score, transit score, crime rate, nearby grocery stores, nearby schools, nearby shopping malls, median rent, and/or the like), wherein each piece of neighborhood information is represented as a numerical value; perform data processing as necessary.
2. Normalize the dataset such that all values thereof are between zero (0) and one (1).
3. Specify desired number of clusters k (for example, k=5 due to elbow method and data visualizations).
4. Randomly assign each data point to a cluster, wherein each data point represents a neighborhood in the dataset.
5. Calculate each cluster's centroid.

6. Iterate over each data point and re-assign each data point to the closest cluster centroid based on the Euclidean distance between the data point and the cluster centroid.
7. Re-calculate the cluster centroids.
8. Repeat steps 6 and 7 until no improvement is made to the calculated cluster centroids (for example, the calculated cluster centroids are unchanged).
9. Return cluster that most closely meets user's selection criteria (such as the cluster that the data points thereof are closest to the centroid thereof (for example, measured by the summation of squares of the distances from the data points thereof to the centroid thereof)).

In various embodiments, other suitable ML methods may be used for increased effectiveness. Examples of such ML methods that may be integrated to generate neighborhood recommendations include large language models (LLMs), content-based filtering, collaborative filtering, and/or the like. In some embodiments, a classification algorithm based on unsupervised learning may be used.

In some embodiments, the scam detector engine 332 and/or the rental listing recommendation engine 402 may use a regression model (such as a linear regression model) for listing reliability and value comparison. FIGS. 5A to 5C show gradient descent calculations for a linear regression model.

With the use of a regression model, the scam detector engine 332 and/or the rental listing recommendation engine 402 may perform the following method for listing reliability and value comparison:

1. Build dataset with up-to-date rental listing descriptions with necessary features such as postal code, type of unit, number of bedrooms, number of bathrooms, square feet, price, and/or the like; perform data processing as necessary.
2. Initialize all parameters, and predict the value of a dependent variable given independent variables.
3. Compute the difference between the predicted value and the true value using the Mean-Squared Error (MSE) function:

$$MSE = \frac{1}{n}\sum_{i=1}^{n}\left(Y_i - \hat{Y}_i\right)^2$$

where $\hat{Y}_i$ represents the predicted value and $Y_i$ represents the true value.
4. Perform gradient descent to minimize the MSE function by taking partial derivatives with respect to the coefficients of the independent variables (for example, m for every xi and c); see FIGS. 5A to 5C for calculations.
5. Update the values of the coefficients for each independent variables.
6. Repeat until convergence.

In some embodiments, the scam detector engine 332 and/or the rental listing recommendation engine 402 may use other regression models (such as an XGBoost regression model). As those skilled in the art understand, XGBoost is an optimized distributed gradient boosting library that implements machine learning algorithms under the Gradient Boosting framework; see: https://xgboost.readthedocs.io/en/stable/index.html. In these embodiments, the system 100 performs the following method for listing reliability and value comparison:

1. Build dataset with up-to-date rental listing descriptions with necessary features such as postal code, type of unit, number of bedrooms, number of bathrooms, square feet, price, and/or the like; perform data processing as necessary.

2. Train the dataset using an XGBoost regression model.

3. Tune the XGBoost hyperparameters to achieve optimal accuracy.

Those skilled in the art will appreciate that, in various embodiments, other suitable ML methods may be used. Examples of such ML methods may include random forest regressor, support vector machine, ridge regression, and/or the like.

Figure 6:
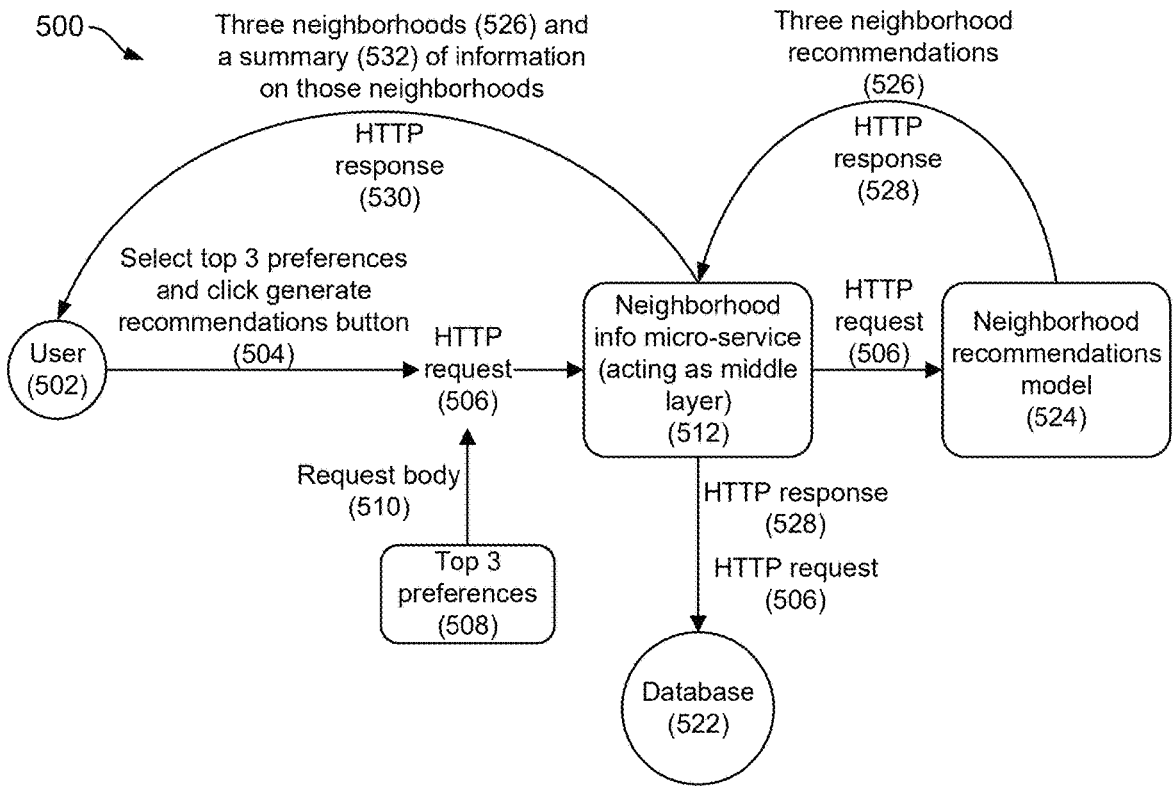
FIG. 6 is a flowchart showing the steps of a recommendation generation procedure, according to some embodiments of this disclosure.

FIG. 6 is a flowchart showing the steps of a recommendation generation procedure. As shown, a user 502 may select top three preferences and click generate recommendations button (step 504). A hypertext transfer protocol (HTTP) request 506 with the selected top three preferences 508 as the request body 510 is then sent to a neighborhood information micro-service 512 (acting as a middle layer). The neighborhood information micro-service 512 stores the HTTP request 506 in the database 522, and sends the HTTP requests 506 to the neighborhood recommendations model 524. The neighborhood recommendations model 524 generates three neighborhood recommendations 526 and sends the three neighborhood recommendations 526 to the neighborhood information micro-service 512 via a HTTP response 528. The neighborhood information micro-service 512 stores the HTTP response 528 in the database 522, and sends a HTTP response 532 to the user 502, wherein the HTTP response 532 may have the same content of the HTTP response 528 (that is, the three neighborhood recommendations 526), or may comprise the three neighborhood recommendations 526 and a summary 532 of information on those neighborhoods 526.

Figure 7:
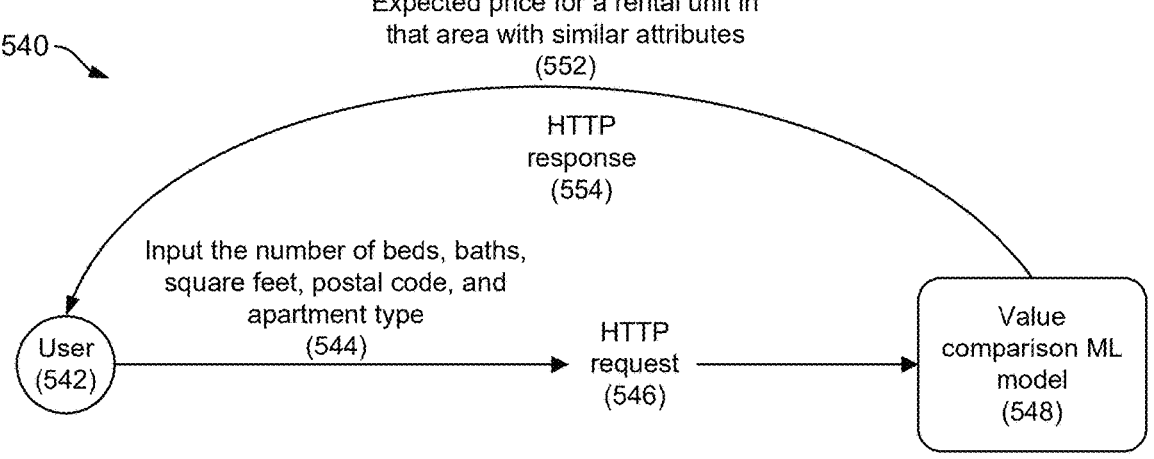
FIG. 7 is a flowchart showing the steps of a value comparison generation procedure, according to some embodiments of this disclosure.

FIG. 7 is a flowchart 540 showing the steps of a value comparison generation procedure. As shown, a user 542 may input his/her preferences 544 such as the number of beds, baths, square feet, postal code, and apartment type. The entered preferences 544 are then sent to a value comparison ML model 548 via a HTTP request 546. The value comparison ML model 548 determines the expected price for a rental unit in a target area with similar attributes, and sends the expected price 552 to the user 542 via a HTTP response 554.

In some embodiments, the system 100 may comprise a neighborhood recommendation tool. A user may use a front-end to input the neighborhood preferences information that the user inputs. These inputs may be provided to the neighborhood information service (acting as a "middle layer"), and communicate the inputs to the neighborhood recommendation engine, which uses its ML model to generate neighborhood recommendations. The neighborhood recommendation engine 322 may communicate its neighborhood recommendation results to the neighborhood information micro-service 512, which retrieves information about those neighborhoods from its database. Then, the neighborhood information micro-service 512 may communicate the recommended neighborhoods to the front-end to be displayed to the user, and also communicate information about each neighborhood.

In some embodiments, the system 100 may comprise a value comparison tool. A user may use the front-end to enter information about the listing. This information may be analyzed by the value comparison ML model 548. The analysis results are then returned to the front-end to be displayed to the user (for example, same as the listing price average, above average, or below average).

In some embodiments, the system 100 may comprise a rental deposit tool. A user may use the front-end to enter information about rental deposit. A pre-approval micro-service may assess that information using a rules-based system to determine the coverage amount the user is eligible for. The pre-approval micro-service may then communicate the assessment results (such as a quote and/or amount the user is pre-approved for) to the front-end to be displayed to the user. The pre-approval micro-service may also be connected to an API where users may sign up for the deposit alternative product.

FIGS. 8A to 8H are screenshots showing an exemplary user interaction flow. As shown, a user may first enter the landing page or homepage 602 of the system 100, in which they are able to observe the three key features of the system 100, that is, (1) neighborhood recommendation 606, (2) value comparison tool 608, and (3) rental deposit solution 610. The user may immediately see at a high level what these tools may offer for them. The user may use the navigation bar to access these tools independently. Additionally, there is the main user flow taking them through personalization process of the rental journey.

Figure 8A:
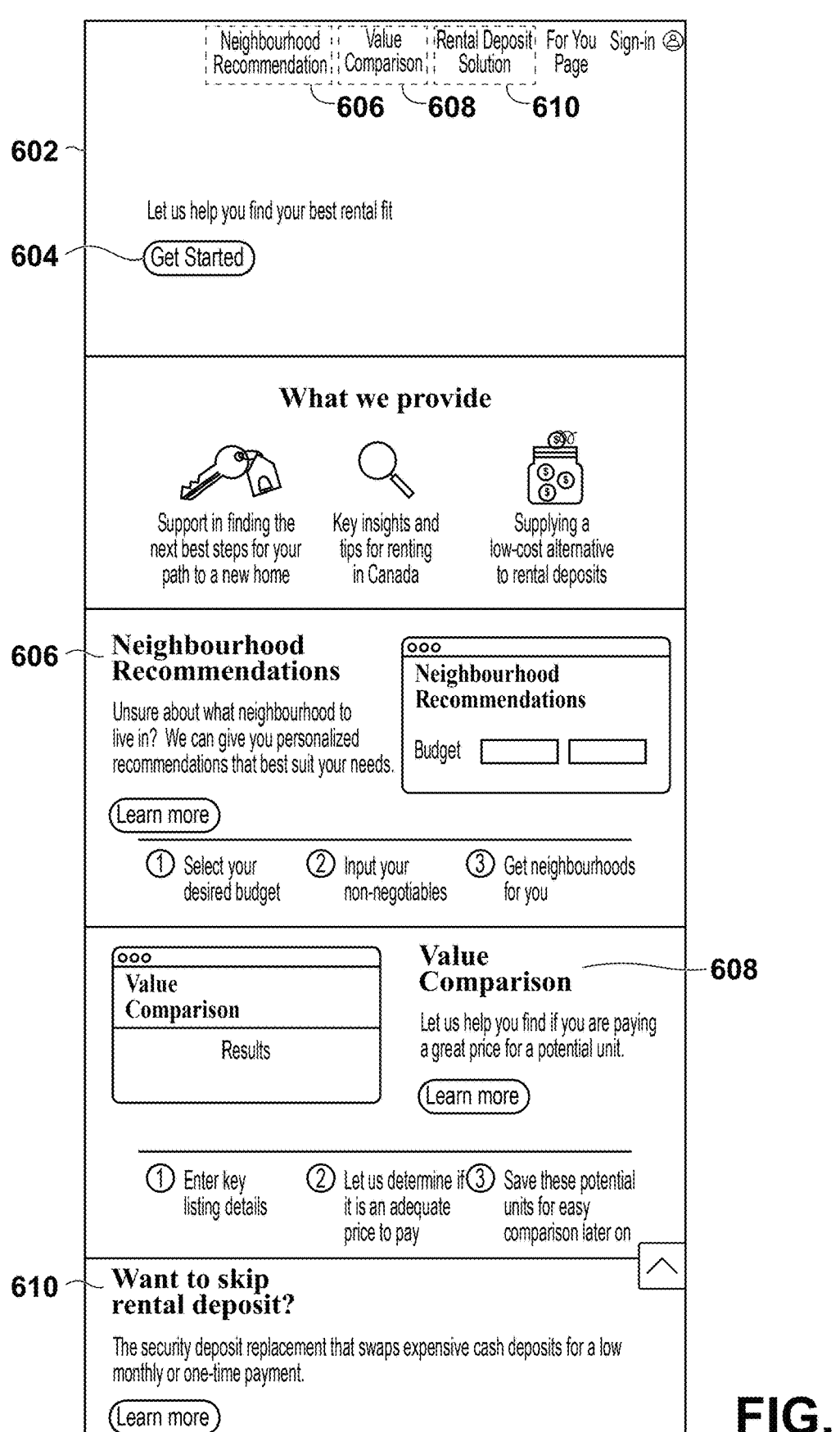
Figure 8B:
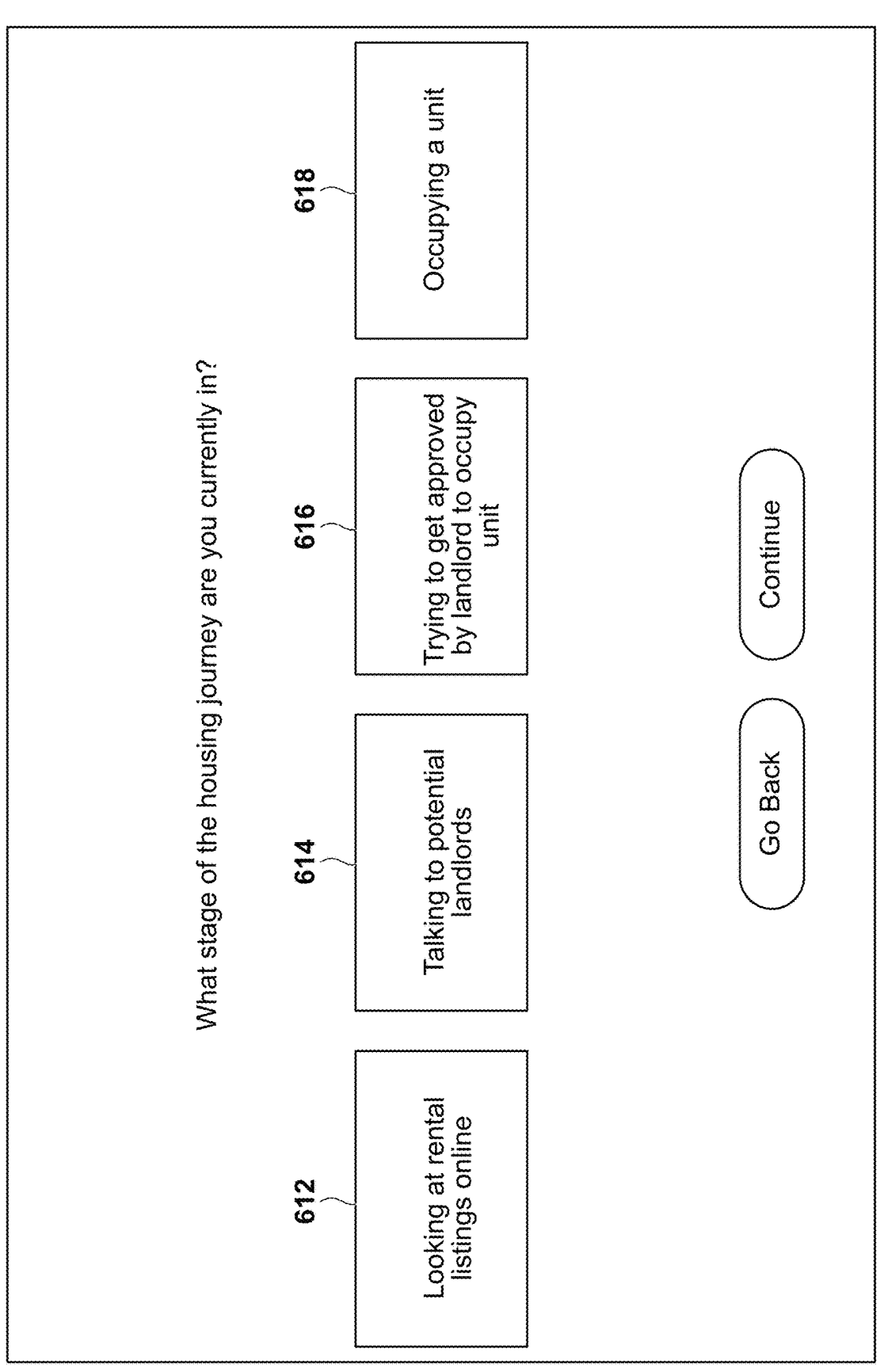
Figure 8C:
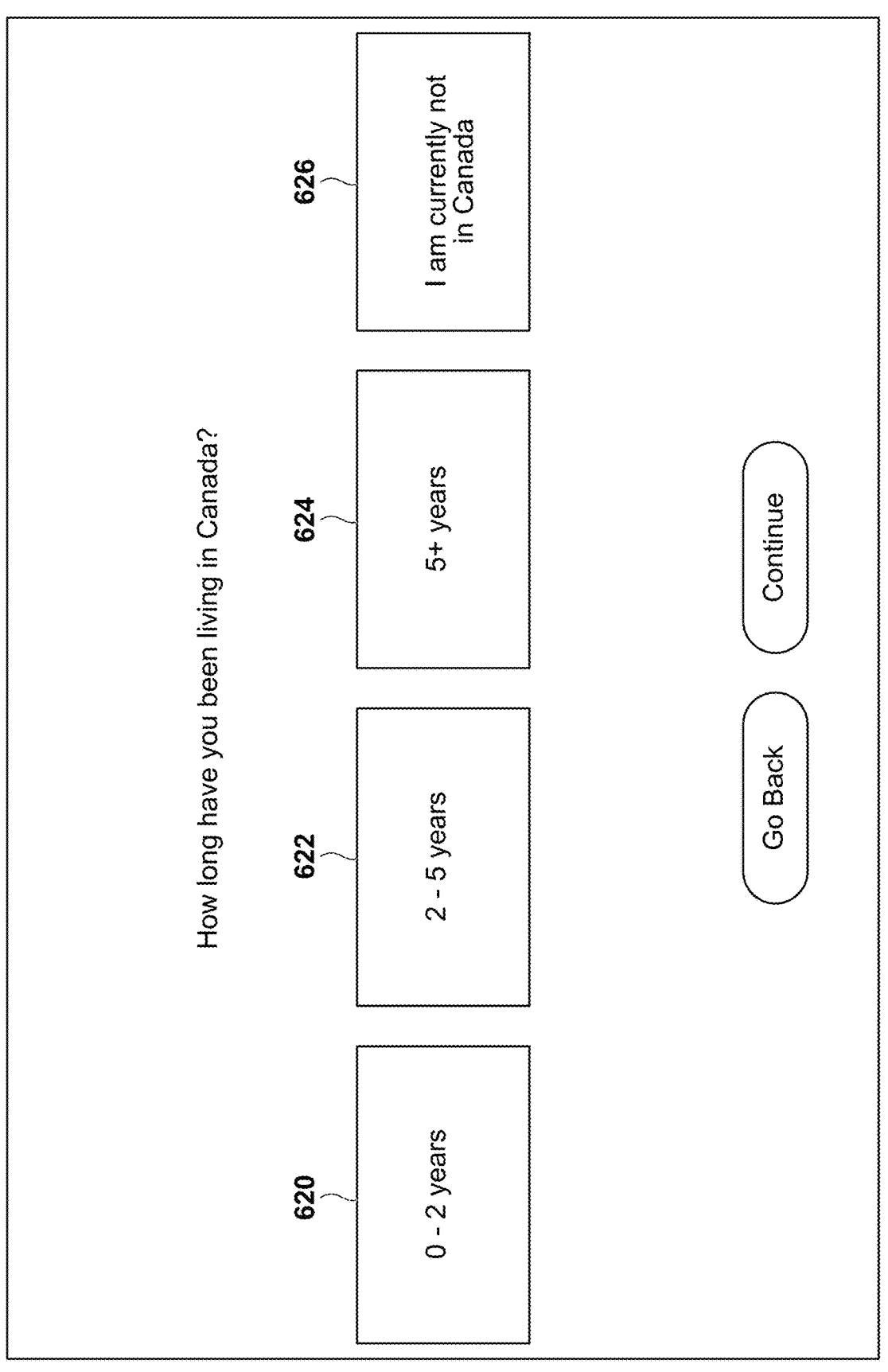

When the user clicks on the call-to-action "Get Started" button 604 on the landing page 602, they may be requested to provide some onboarding information (see FIG. 8B). Depending on what stage (e.g., options 612, 614, 616, 618) of the rental journey they are in, they may be asked to give additional information (see FIG. 8C). For example, if it is determined that the user is in the "Search" phase of the rental journey, the system may determine if they have chosen a neighborhood yet. When the user indicates that they are looking at rental listings online by selecting option 612, the user may be prompted to indicate how long they have been living in Canada (e.g., options 620, 622, 624, 626).

Figure 8D:
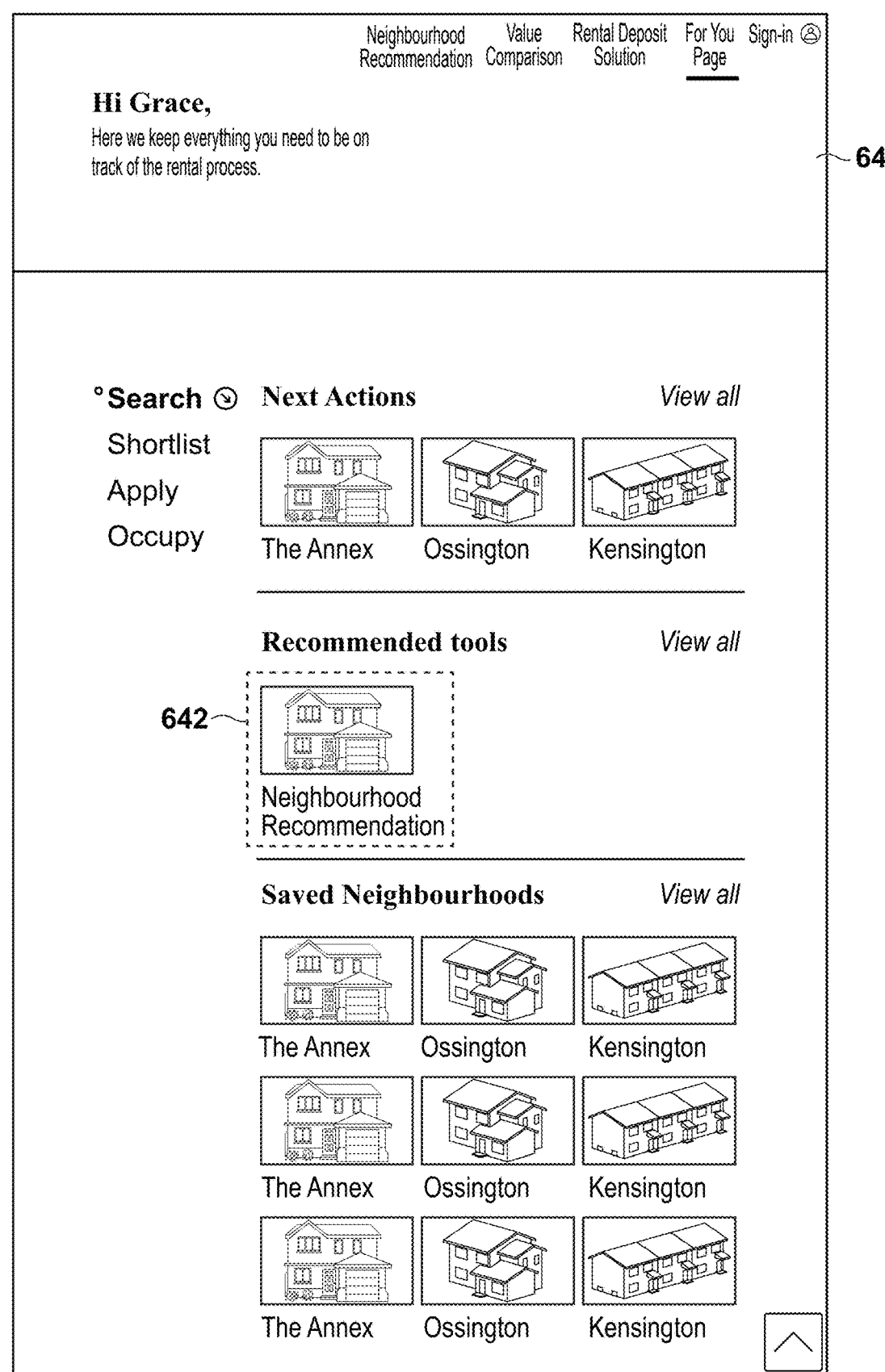

Once it is determined what stage of the journey the user is from, the system 100 may create a personalized "for-your-page (FYP)" 640 for the rental journey (see FIG. 8D). This contains specific action items the user needs to complete before they move on to the next phase of the journey, recommended tools they may utilize at this stage, and other features such as neighborhoods they have saved from the neighborhood recommender tool. The user may click the "Neighborhood Recommendation" icon 642 to search neighborhoods for recommendations. FIG. 8E is an exemplary screenshot showing the search options such as budget range 652, neighborhood goals 654 (for example, grocery stores, safety, transit-friendly, restaurants, schools, walkability, and/or the like. In various embodiments, other search options may be additionally and/or alternatively used.

Figure 8F:
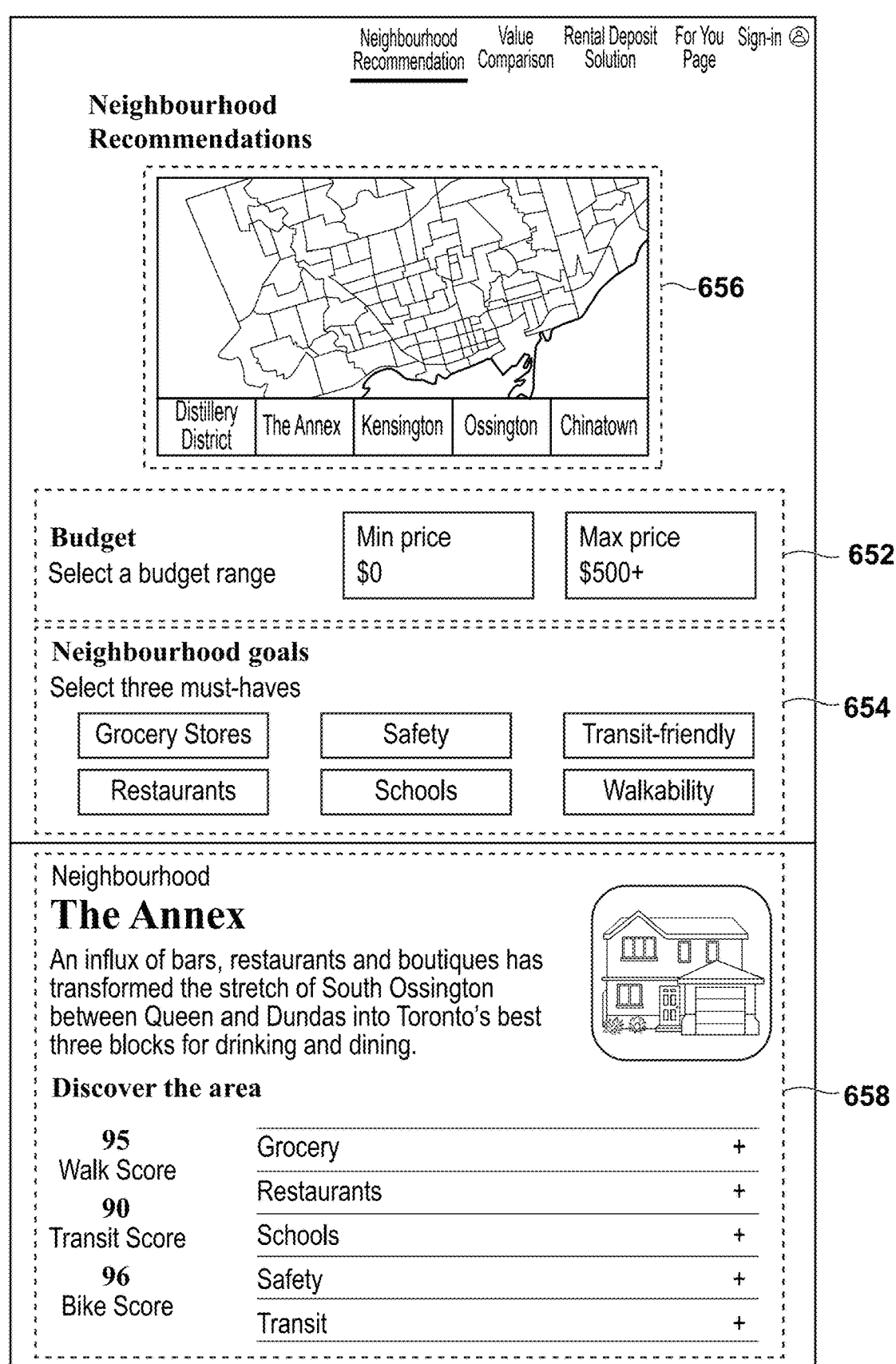

An exemplary screenshot of the neighborhood recommendation results is shown in FIG. 8F, which shows the user-selected budget range 652, the user-selected neighborhood goals 654, a map 656, and the recommended neighborhood or community 658 with relevant information such as walk score, transit score, bike score, grocery information, restaurant information, school information, safety information, transit information, and/or the like.

Referring back to FIG. 8A, the user may also click the "Neighborhood Recommendation" link 606 on the landing page 602 to search neighborhoods for recommendations (see FIGS. 8E and 8F for exemplary screenshots of search options and neighborhood recommendation results, respectively).

Figure 8G:
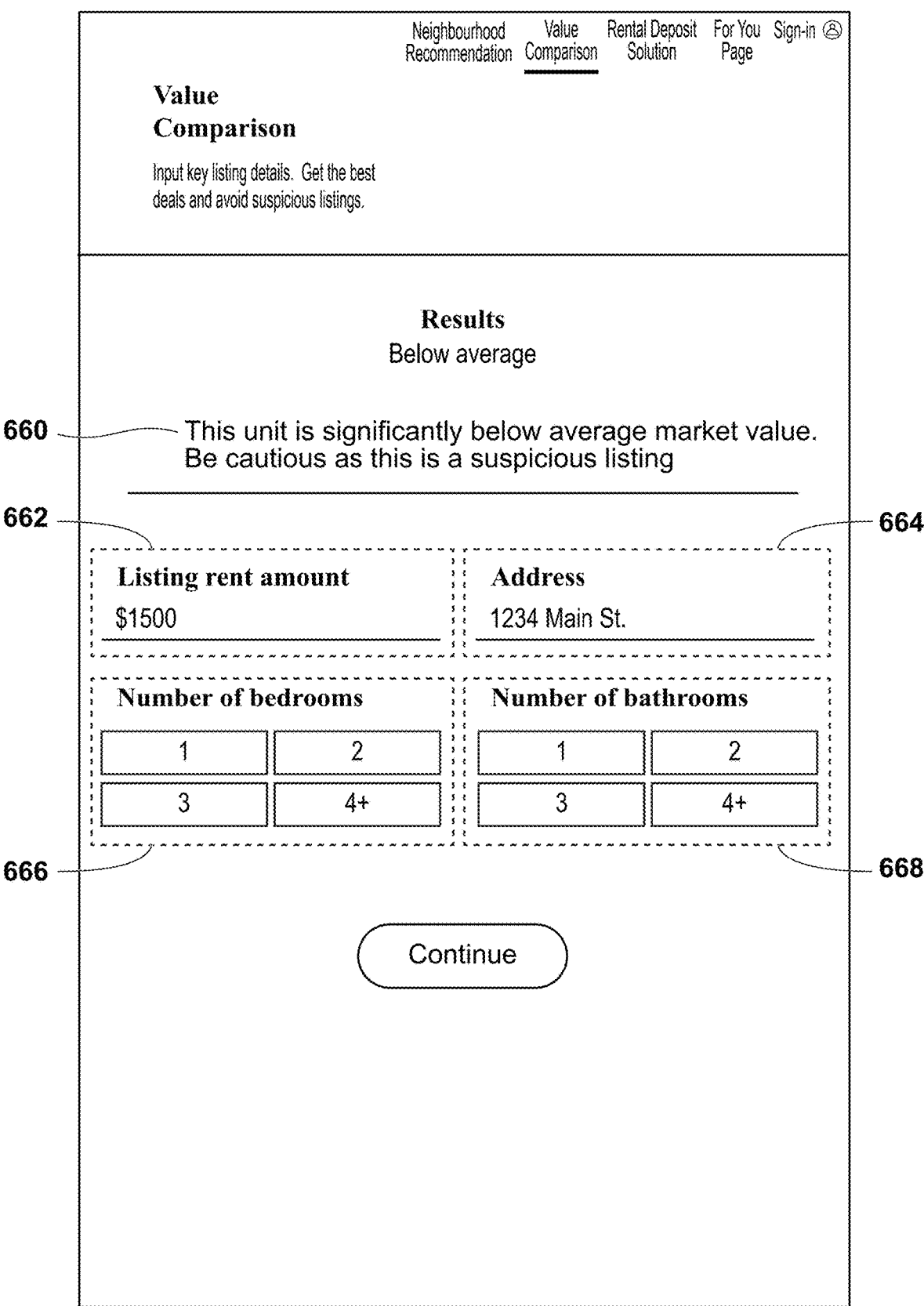

The user may click the "Value Comparison" link 608 on the landing page 602 to access the value comparison tool (see FIG. 8G, showing the value of recommended neighborhood compared to the market value (results 660), and relevant information of the recommended neighborhood such as listing rent amount 662, address 664, number of bedrooms 666, number of bathrooms 668, and/or the like), or click the "Rental Deposit Solution" link 610 on the landing page 602 to access the rental deposit solution tool (not shown).

When the user is in the "Search" phase of the journey, the system 100 may recommend the user regarding specific action items such as "Gather documentation", which asks the user to email their employers for proof of payment, or their landlords for reference letters. In one card, the system 100 provides the user with the templates and resources they need to send these requests out.

As another example, the user may use the "Create List of Requirements" action item to choose from a list of requirements most important thereto in finding a unit to live in. The user may go through the listings they have inputted and saved from the value comparison tool, and checkmark those meet the list of requirements they determined from their "Create List of Requirements" action item. The user may also tag the listings as "visited" or "shortlisted" or "contacted landlord", which may be used by an application tracker of the system 100 for tracking the user's rental finding process.

Once the user feels satisfied with the completion of this phase, they may move at their own leisure to the next stage of the journey where the system 100 may continue to give the user specific action items to complete, and personalized resources.

As mentioned previously, the user may use above-described three tools independently. For the neighborhood recommendation tool, the user may get recommendations or search specifically for neighborhoods they are interested in to gain insights.

For the value comparison tool, the user may enter key listing details and the system 100 may determine if the listed price is above, below, or at average price for that type of unit in that area. This allows the user to understand how to gauge price in a new neighborhood, be weary of rental listings that may be "too good to be true" or if it is overpriced. From here, when the user saves the listing to their account, the saved listing may appear on the user's "For You Page" for easy access.

In some embodiments, the rental deposit solution function may be encapsulated by the landing page that illustrates to the user the benefits, and how-to's of the product.

In some embodiments, the methods disclosed herein may be performed by a single computing device 104 or 108 without using the computer network system 100. In other words, the system 100 in these embodiments only comprises a single computing device 104 or 108.

Thus, the computer network system disclosed herein addresses some of the most common and impactful pain points for renters, and provides support across the entire rental journey, including searching for neighborhoods, evaluating listings, applying to different units, and moving into their new home. Examples of the pain points addressed by the computer network system disclosed herein include:

Having to pay a one-month rent deposit, or even larger rental deposits (which sometimes may be up to 6 months' worth of rent).

Paying a large deposit can cause cash flow issues for a renter. Even when they have savings and a steady income, it can be difficult for many to afford a steep deposit. By offering a product that replaces this deposit, the computer network system disclosed herein supports renters in managing their cash flow, and allowing them to keep more cash in their pocket.

The computer network system disclosed herein also solves related pain points for landlords, who often must go through the process of setting up an escrow account to store these deposits, as well as pay the tenants interest on the deposit amount.

Not knowing if a neighborhood is safe, or what a neighborhood is like.

Newcomers and inexperienced renters are often unfamiliar with different neighborhoods, and often find it difficult to decide what neighborhood they should live in. The computer network system disclosed herein collects users' preferences and uses one or more ML models to deliver personalized neighborhood recommendations to users. This helps them narrow down which neighborhoods they would like to live in, based on what those users personally value the most.

When renters are deciding on which neighborhood to live in, it is also difficult to find trustworthy and reliable information about neighborhoods. The computer network system disclosed herein also combines information about different neighborhoods and displays important information that users have stated they would like to know, including, for example, neighborhood safety or crime rates, nearby grocery stores, transit stations, "walkability" scores, and average rent prices. Providing this information helps renters make informed decisions about where to rent.

Being vulnerable to scam listings.

One common piece of renting advice is to avoid listings that seem "too good to be true", as in the prices are so low as to be suspicious. However, many inexperienced renters do not have a clear sense of how much a rental unit "should" cost. The value comparison tool disclosed herein allows users to input a rental unit's listing price, location, and number of bedrooms and/or bathrooms. Then, the value comparison tool may inform the user if the listing price is significantly below average, at average, or significantly above average. If the listing price is significantly below average, the computer network system disclosed herein may provide users with a warning, and give them helpful advice on avoiding scams. Therefore, the computer network system disclosed herein helps users protect themselves from scams and fraud.

As those skilled in the art readily understand, a computer system or a computing device is of limited or even no use if it is not tied to a practical application and/or if it cannot provide sufficient functioning in that practical application. In other words, the usefulness and functioning of a computer system or a computing device needs to be measured in the context of a practical application that the computer system or a computing device is applied therein.

As can be seen from the above description, computer systems have been used in rental and related services for a long time. However, in the practical application of rental and related services, the functioning of the prior-art computer systems and computers thereof is limited. For example, it is often difficult for users of the prior-art computer systems to find rentals meeting their needs. Moreover, neither of these prior-art services offer a product that could be classified as insurance.

With the use of AI engines such as ML engines, the computer systems, computing devices, and computerized methods disclosed herein find rentals that meet users' needs and provide integrated services with improved user experiences. Thus, the computer systems, computing devices, and computerized methods disclosed herein are integrated into a practical application of rental and related services with improvement to the functioning of the computer systems and computers thereof in this practical application, thereby rendering the computer systems and computing devices thereof more useful in this practical application.

The computer systems, computing devices, and computerized methods disclosed herein represent significantly more than merely providing a rental service. In fact, the computer systems, computing devices, and computerized methods disclosed herein provide a practical and technical solution for improving the functioning of the computer network system to better adapt to the rental-related services. With the use of AI engines such as ML engines, computing devices are required as essential elements of the system to perform the method disclosed herein.

As those skilled in the art readily understand, timing and quick response is essential in rental services. While there may be multiple rental properties in the market, a user has to promptly make a decision on selecting an available rental property to rent. In prior art, users have to rely on their knowledge to make such a decision within a limited time period, which, as described above, often leads to unsatisfactory results.

In contrary, the computer systems, computing devices, and computerized methods disclosed herein integrate the power AI engines into the functioning of computers and select rental property candidates for the user. As those skilled in the art readily understand, the AI engines and the AI-based methods disclosed herein are rooted in computer technologies, and are generally unsuitable for humans to practice in their mind. For example, without a computer system and the computers thereof, practicing the methods disclosed herein (for example, practicing such methods in user's mind) would required a prolonged time that the obtained results are obsolete and useless (for example, the obtained rental property candidates have become unavailable). Thus, computing devices are required as essential elements of the system to perform the method disclosed herein.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" docs not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:
1. A computerized method comprising:
receiving, via a first hypertext transfer protocol (HTTP) request, a user's rental preferences including at least a budget range and one or more preferred home features;
storing the received user's rental preferences in a database;
sending the received user's rental preferences from a middle layer to a first machine learning engine via a second HTTP request;
generating, by the first machine learning engine, at least one neighborhood recommendation based on the user's rental preferences by:
normalizing a neighborhood dataset comprising numerical neighborhood information values between zero and one;
clustering the normalized neighborhood dataset into a plurality of clusters using k-means clustering, wherein clustering comprises iteratively assigning each data point to a cluster having a nearest cluster centroid in Euclidean distance, recalculating each cluster centroid, and repeating assignment and recalculation until cluster centroids are unchanged; and selecting one of the plurality of clusters as the neighborhood recommendation, the selected cluster having a minimum summation of squared distances of data points to its centroid;

returning, via a first HTTP response to the second HTTP request, the generated neighborhood recommendation to the middle layer;

sending, via a second HTTP response to the first HTTP request, the generated neighborhood recommendation to a user device;

receiving, via a third HTTP request to the middle layer, listing details of a candidate rental unit including a unit price;

providing the listing details to a second machine learning engine;

determining, by the second machine learning engine, an expected rental price for a unit having the listing details based on a regression model trained on historical rental listings; and returning, via a fourth HTTP response, a comparison of the unit price to the expected rental price to the user device, wherein the first machine learning engine is executed as a micro-service that is accessible via the second HTTP request and the first HTTP response, and wherein the second machine learning engine comprises an XGBoost regression model employing decision-tree base learners, the model being trained on historical rental listings and tuned via hyperparameter optimization to minimize mean squared error.

2. The method of claim 1, wherein the one or more preferred home features comprise one or more of walk score, transit score, safety, proximity to grocery stores, proximity to schools, or median rent.

3. The method of claim 1, wherein the listing details further comprises one or more of number of beds, number of baths, square feet, postal code, or apartment type.

4. The method of claim 1, wherein the neighborhood dataset comprises a plurality of data points, each data point representing a neighborhood and including numerical values for two or more neighborhood information attributes.

5. The method of claim 1, wherein normalizing the neighborhood dataset comprises scaling each numerical neighborhood information value to a range between 0 and 1.

6. The method of claim 1, wherein the k-means clustering uses a value of k determined by an elbow-method analysis performed on the neighborhood dataset.

7. The method of claim 1, wherein selecting the one of the plurality of clusters as the neighborhood recommendation comprises selecting the cluster whose sum of squared distances of its data points to the cluster centroid is minimum among the plurality of clusters.

8. A non-transitory computer-readable storage device storing instructions that, when executed by one or more processors, cause the one or more processors to perform a method comprising:

receiving, via a first hypertext transfer protocol (HTTP) request, a user's rental preferences including at least a budget range and one or more preferred home features;

storing the received user's rental preferences in a database;

sending the received user's rental preferences from a middle layer to a first machine learning engine via a second HTTP request;

generating, by the first machine learning engine, at least one neighborhood recommendation based on the user's rental preferences by:

normalizing a neighborhood dataset comprising numerical neighborhood information values between zero and one;

clustering the normalized neighborhood dataset into a plurality of clusters using k-means clustering, wherein clustering comprises iteratively assigning each data point to a cluster having a nearest cluster centroid in Euclidean distance, recalculating each cluster centroid, and repeating assignment and recalculation until cluster centroids are unchanged; and selecting one of the plurality of clusters as the neighborhood recommendation, the selected cluster having a minimum summation of squared distances of data points to its centroid;

returning, via a first HTTP response to the second HTTP request, the generated neighborhood recommendation to the middle layer;

sending, via a second HTTP response to the first HTTP request, the generated neighborhood recommendation to a user device;

receiving, via a third HTTP request to the middle layer, listing details of a candidate rental unit including a unit price;

providing the listing details to a second machine learning engine;

determining, by the second machine learning engine, an expected rental price for a unit having the listing details based on a regression model trained on historical rental listings; and returning, via a fourth HTTP response, a comparison of the unit price to the expected rental price to the user device, wherein the first machine learning engine is executed as a micro-service that is accessible via the second HTTP request and the first HTTP response, and wherein the second machine learning engine comprises an XGBoost regression model employing decision-tree base learners, the model being trained on historical rental listings and tuned via hyperparameter optimization to minimize mean squared error.

9. The non-transitory computer-readable storage device of claim 8, wherein the one or more preferred home features comprise one or more of walk score, transit score, crime rate, proximity to grocery stores, proximity to schools, or median rent.

10. The non-transitory computer-readable storage device of claim 8, wherein the listing details further comprises one or more of number of beds, number of baths, square feet, postal code, or apartment type.

11. The non-transitory computer-readable storage device of claim 8, wherein the neighborhood dataset comprises a plurality of data points, each data point representing a neighborhood and including numerical values for two or more neighborhood information attributes.

12. The non-transitory computer-readable storage device of claim 8, wherein normalizing the neighborhood dataset comprises scaling each numerical neighborhood information value to a range between 0 and 1.

13. The non-transitory computer-readable storage device of claim 8, wherein the k-means clustering uses a value of k determined by an elbow-method analysis performed on the neighborhood dataset.

14. The non-transitory computer-readable storage device of claim 8, wherein selecting the one of the plurality of clusters as the neighborhood recommendation comprises selecting the cluster whose sum of squared distances of its data points to the cluster centroid is minimum among the plurality of clusters.

15. A system comprising:

one or more processors; and one or more non-transitory computer-readable storage media functionally coupled to the one or more processors;

wherein the or more non-transitory computer-readable storage media comprise computer-executable instructions; and wherein the instructions, when executed, cause the one or more processors to perform actions comprising:

receiving, via a first hypertext transfer protocol (HTTP) request, a user's rental preferences including at least a budget range and one or more preferred home features;

storing the received user's rental preferences in a database;

sending the received user's rental preferences from a middle layer to a first machine learning engine via a second HTTP request;

generating, by the first machine learning engine, at least one neighborhood recommendation based on the user's rental preferences by:

normalizing a neighborhood dataset comprising numerical neighborhood information values between zero and one;

clustering the normalized neighborhood dataset into a plurality of clusters using k-means clustering, wherein clustering comprises iteratively assigning each data point to a cluster having a nearest cluster centroid in Euclidean distance, recalculating each cluster centroid, and repeating assignment and recalculation until cluster centroids are unchanged; and selecting one of the plurality of clusters as the neighborhood recommendation, the selected cluster having a minimum summation of squared distances of data points to its centroid;

returning, via a first HTTP response to the second HTTP request, the generated neighborhood recommendation to the middle layer;

sending, via a second HTTP response to the first HTTP request, the generated neighborhood recommendation to a user device;

receiving, via a third HTTP request to the middle layer, listing details of a candidate rental unit including a unit price;

providing the listing details to a second machine learning engine;

determining, by the second machine learning engine, an expected rental price for a unit having the listing details based on a regression model trained on historical rental listings; and returning, via a fourth HTTP response, a comparison of the unit price to the expected rental price to the user device, wherein the first machine learning engine is executed as a micro-service that is accessible via the second HTTP request and the first HTTP response, and wherein the second machine learning engine comprises an XGBoost regression model employing decision-tree base learners, the model being trained on historical rental listings and tuned via hyperparameter optimization to minimize mean squared error.

16. The system of claim 15, wherein the one or more preferred home features comprise one or more of walk score, transit score, crime rate, proximity to grocery stores, proximity to schools, or median rent.

17. The system of claim 15, wherein the listing details further comprises one or more of number of beds, number of baths, square feet, postal code, or apartment type.

18. The system of claim 15, wherein the neighborhood dataset comprises a plurality of data points, each data point representing a neighborhood and including numerical values for two or more neighborhood information attributes.

19. The system of claim 15, wherein the k-means clustering uses a value of k determined by an elbow-method analysis performed on the neighborhood dataset.

20. The system of claim 15, wherein selecting the one of the plurality of clusters as the neighborhood recommendation comprises selecting the cluster whose sum of squared distances of its data points to the cluster centroid is minimum among the plurality of clusters.

* * * * *